US012591576B2

(12) United States Patent (10) Patent No.: US 12,591,576 B2
Amour et al. (45) Date of Patent: Mar. 31, 2026

(54) DRILLING PERFORMANCE ASSISTED WITH AN ARTIFICIAL INTELLIGENCE ENGINE

(71) Applicant: Schlumberger Technology Corporation, Sugar Land, TX (US)

(72) Inventors: Myriam Amour, Montpellier (FR); Agustin Soriano Rementeria, Montpellier (FR); Valerian Guillot, Montpellier (FR); Benedictus Kent Rachmat, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 22 days.

(21) Appl. No.: 18/820,414

(22) Filed: Aug. 30, 2024

(65) Prior Publication Data

US 2025/0181581 A1 Jun. 5, 2025

Related U.S. Application Data

(60) Provisional application No. 63/604,217, filed on Nov. 30, 2023.

(51) Int. Cl.
*G06F 16/2455* (2019.01)
*G06F 16/21* (2019.01)
*G06F 16/2458* (2019.01)

(52) U.S. Cl.
CPC ........ *G06F 16/2455* (2019.01); *G06F 16/211* (2019.01); *G06F 16/2458* (2019.01)

(58) Field of Classification Search
CPC . G06F 16/211; G06F 16/2455; G06F 16/2458
See application file for complete search history.

(56) References Cited

U.S. PATENT DOCUMENTS

2014/0280742 A1* 9/2014 Raja ..................... H04L 67/565
709/219
2023/0169071 A1* 6/2023 Nalala Pochaiah .........................
G06F 16/24575
707/767

(Continued)

FOREIGN PATENT DOCUMENTS

CN 114938337 A * 8/2022 ........... G06F 18/214

OTHER PUBLICATIONS

DIN-SQL: Decomposed In-Context Learning of Text-to-SQL with Self-Correction(Pourreza, 2023) (Year: 2023).*

(Continued)

*Primary Examiner* — William S Brockington, III
*Assistant Examiner* — Theodore Xie
(74) *Attorney, Agent, or Firm* — Jeffrey D. Frantz

(57) ABSTRACT

A method for extracting data from a database for use in a well construction process includes receiving a question from a user. The question is in a well construction language. The method also includes determining context based upon the question. Determining the context includes retrieving key performance indicators (KPIs) based upon the question, and retrieving a plurality of tables from the database. The tables are retrieved based upon the question. The method also includes generating a prompt based upon the question and the context. The method also includes generating a structured query language (SQL) query based upon the prompt using a large language model (LLM). The method also includes running the SQL query against the tables in the database in an attempt to produce a new table. The method also includes performing a wellsite action in response to the new table.

16 Claims, 9 Drawing Sheets

(56) References Cited

U.S. PATENT DOCUMENTS

| | | | |
|---|---|---|---|
| 2023/0185799 A1* | 6/2023 | Hoang | G06F 40/30 |
| | | | 704/2 |
| 2025/0111106 A1* | 4/2025 | Fogat | G06F 30/27 |
| 2025/0173330 A1* | 5/2025 | Durg | G06F 16/243 |

OTHER PUBLICATIONS

RAG-in-a-Box on Amazon EC2 using Open-Source—Part 1(David Min, 2023) (Year: 2023).*

Retrieval-augmented GPT-3.5-based Text-to-SQL Framework with Sample-aware Prompting and Dynamic Revision Chain(Guo et al) (Year: 2023).*

"GPT-3-NLP-to-SQL", Retrieved from the internet: https://github.com/rajshekharM/gpt-3-NLP-to-SQL, 2 Pages.

"Ria GPT Natural Language Interface to Postgres", Retrieved from the internet: https://web.archive.org/web/20231123085502/https://github.com/drorm/ria, Nov. 23, 2023, 3 Pages.

"How Do I Create a Custom Model for Text to SQL Queries?", Retreived from the internet: https://web.archive.org/web/20231122185412/https://community.openai.com/t/how-do-i-create-a-custom-model-for-text-to-sql-queries/205539, Nov. 25, 2023, 6 Pages.

* cited by examiner

| | ID | BOREHOLE_ID | BOREHOLE_NAME | START_DEPTH | END_DEPTH | STAND_TIME |
|---|---|---|---|---|---|---|
| 1 | 10971561 | 377 | LORIS 13H | 1651 | 1678.37 | 49.5 |
| 2 | 10971787 | 377 | LORIS 13H | 1678.37 | 1707.15272727273 | 58.4166666666666666666666666 |
| 3 | 10972027 | 377 | LORIS 13H | 1707.15272727273 | 1736.24254545454 | 87.6666666666666666666666666 |
| 4 | 10972507 | 377 | LORIS 13H | 1736.24254545454 | 1765.570001 | 61.7500000000000000000000002 |
| 5 | 10972767 | 377 | LORIS 13H | 1765.570001 | 1795 | 86.58333333333333333333336 |
| 6 | 10973082 | 377 | LORIS 13H | 1795 | 1824.15919279032 | 97.66666666666666666666668 |
| 7 | 10973529 | 377 | LORIS 13H | 1824.15919279032 | 1853.99803030303 | 79.99999999999999999999998 |
| 8 | 10973861 | 377 | LORIS 13H | 1853.99803030303 | 1883.2106779661 | 82.16666666666666666666664 |
| 9 | 10974175 | 377 | LORIS 13H | 1883.2106779661 | 1912.2175 | 127.333333333333333333333333 |
| 10 | 10974758 | 377 | LORIS 13H | 1912.2175 | 1941.03970588235 | 149.0833333333333333333333 |
| 11 | 10975385 | 377 | LORIS 13H | 1941.03970588235 | 1971 | 112.75 |
| 12 | 10975760 | 377 | LORIS 13H | 1971 | 2000.365 | 111.916666666666666666666667 |
| 13 | 10976160 | 377 | LORIS 13H | 2000.365 | 2029.45 | 114.583333333333333333333333 |
| 14 | 10976398 | 377 | LORIS 13H | 2029.45 | 2057.06736757895 | 123.25 |
| 15 | 10976752 | 377 | LORIS 13H | 2057.06736757895 | 2086 | 112.666666666666666666666667 |
| 16 | 10976987 | 377 | LORIS 13H | 2086 | 2116 | 74.74999999999999999999998 |
| 17 | 10977156 | 377 | LORIS 13H | 2116 | 2144.1380006 | 90 |
| 18 | 10977392 | 377 | LORIS 13H | 2144.1380006 | 2173 | 62.25 |
| 19 | 10977493 | 377 | LORIS 13H | 2173 | 2201.03000009091 | 70.66666666666666666666668 |
| 20 | 10977603 | 377 | LORIS 13H | 2201.03000009091 | 2230.509999 | 76.4166666666666666666666666 |
| 21 | 10977772 | 377 | LORIS 13H | 2230.509999 | 2235.07322033898 | 71.5000000000000000000000002 |
| 22 | 10966022 | 377 | LORIS 13H | 1183.87542372881 | 1213 | 121.666666666666666666666667 |
| 23 | 10966792 | 377 | LORIS 13H | 1213 | 1242 | 76.3333333333333333333333332 |
| 24 | 10967244 | 377 | LORIS 13H | 1242 | 1271.18919437097 | 52.66666666666666666666667 |
| 25 | 10967526 | 377 | LORIS 13H | 1271.18919437097 | 1301 | 46.1666666666666666666666669 |
| 26 | 10967751 | 377 | LORIS 13H | 1301 | 1330.21745621818 | 54.8333333333333333333333333 |

FIG. 4A

| | CONN_TIME | OPERATION_COD | ROP_ON_BOTTOM |
|---|---|---|---|
| 1 | 3.9166666666666666666666666666667 | DRILLING | 44.1661313395333333333333333333333 |
| 2 | 4.0833333333333333333333333334 | DRILLING | 39.6871877216391608391608391608391608 398 |
| 3 | 4 | DRILLING | 33.4970349820444444444444444444516 |
| 4 | 3.9166666666666666666666666666667 | DRILLING | 36.8743805669271028037831775700934579442 |
| 5 | 4.1666666666666666666666666666667 | DRILLING | 41.2416102796849104859335083631713555062 |
| 6 | 4.4166666666666666666666666666667 | DRILLING | 34.4549112936191999999999999999999974 |
| 7 | 4 | DRILLING | 27.1950389662135537190082644628099173557 4 |
| 8 | 4.4166666666666666666666666666667 | DRILLING | 24.2295219507476635514018691588785046729 5 |
| 9 | 3.75 | DRILLING | 17.3685176178091185410334346504559270514 6 |
| 10 | 3.75 | DRILLING | 14.0243687667348837209302325581395348837 2 |
| 11 | 4.58333333333333333333333333333 | DRILLING | 27.3181518132284360189573459715639810423 1 |
| 12 | 4.33333333333333333333333333333 | DRILLING | 19.2952652508409090909090909090909063 |
| 13 | 4.6666666666666666666666666666667 | DRILLING | 22.9483295048865671641791044776119402982 3 |
| 14 | 4.5 | DRILLING | 21.2222054138758620689655172413793103448 3 |
| 15 | 4.0833333333333333333333333334 | DRILLING | 19.7260693240109936575052854122621564480 4 |
| 16 | 3.9166666666666666666666666666667 | DRILLING | 32.9101060760362976406533575317604355716 7 |
| 17 | 4.4166666666666666666666666666667 | DRILLING | 25.6259333386911511789181692094313453536 73 |
| 18 | 4.1666666666666666666666666666667 | DRILLING | 37.3652787304391389432485322896281800390 9 |
| 19 | 4.6666666666666666666666666666667 | DRILLING | 33.4013620948840677966101694915254237285 4 |
| 20 | 3.75 | DRILLING | 29.3739081134668740279937791601866251940 5 |
| 21 | 4.6666666666666666666666666666667 | DRILLING | 33.0552649501685950413223140495867768594 2 |
| 22 | 5.0833333333333333333333333333 | LEAKOFF | 20.8435867875606217616580310880829015545 6 |
| 23 | 4.25 | DRILLING | 27.6206324176800000000000000000000004 |
| 24 | 4.6666666666666666666666666666667 | DRILLING | 47.5723435123926199261992619926199887 |
| 25 | 4.25 | DRILLING | 51.6509340513471571906354515050167224096 4 |
| 26 | 3.83333333333333333333333333333 | DRILLING | 44.9807734756086687306501547987616099070 3 |

FIG. 4B

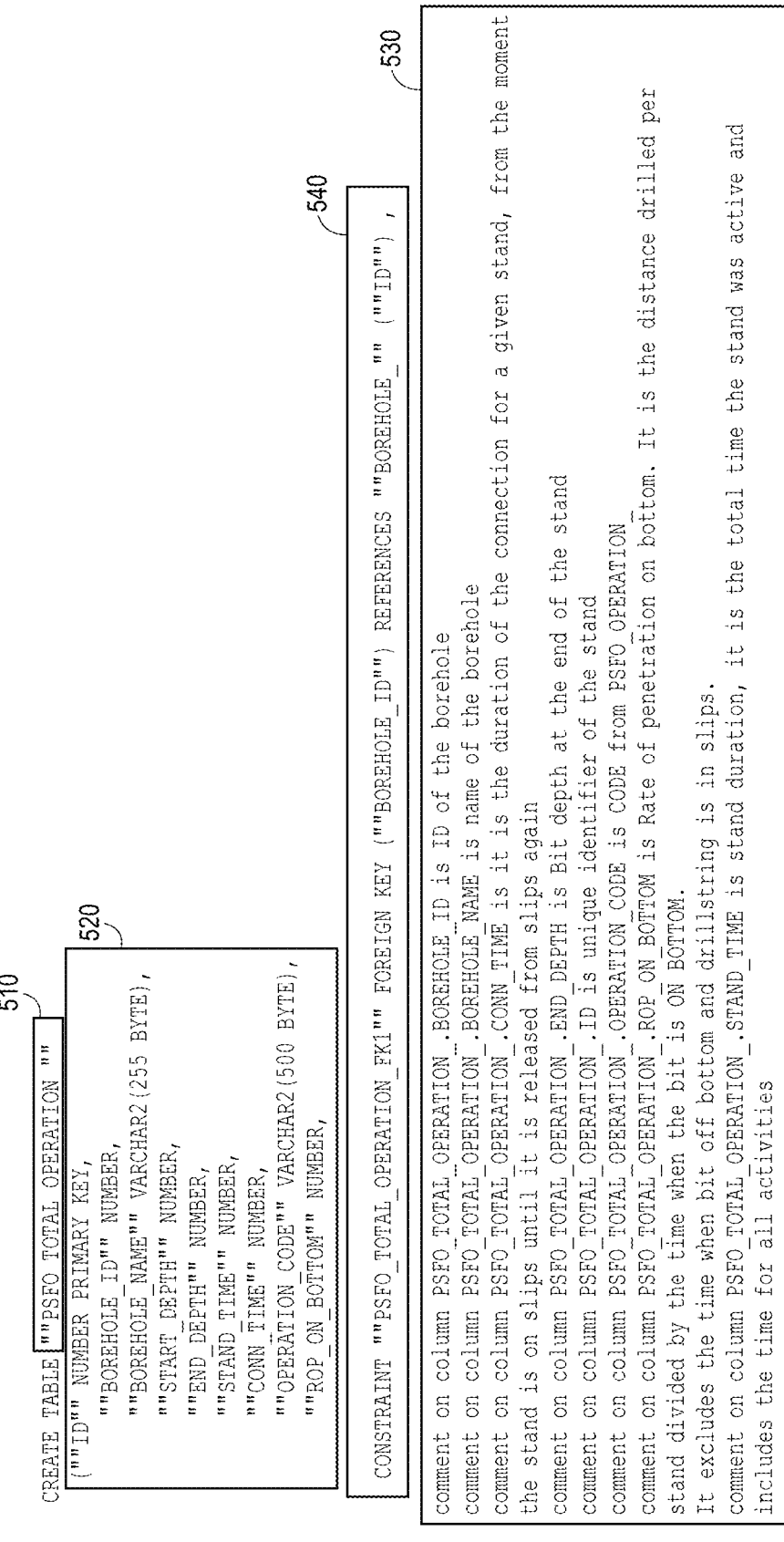

510

```
CREATE TABLE ""PSFO_TOTAL_OPERATION_""
(""ID"" NUMBER PRIMARY KEY,
 ""BOREHOLE_ID"" NUMBER,
 ""BOREHOLE_NAME"" VARCHAR2(255 BYTE),
 ""START_DEPTH"" NUMBER,
 ""END_DEPTH"" NUMBER,
 ""STAND_TIME"" NUMBER,
 ""CONN_TIME"" NUMBER,
 ""OPERATION_CODE"" VARCHAR2(500 BYTE),
 ""ROP_ON_BOTTOM"" NUMBER,
```

520

```
CONSTRAINT ""PSFO_TOTAL_OPERATION_FK1"" FOREIGN KEY (""BOREHOLE_ID"") REFERENCES ""BOREHOLE_"" (""ID"") ,
```

540

```
comment on column PSFO_TOTAL_OPERATION_.BOREHOLE_ID is ID of the borehole
comment on column PSFO_TOTAL_OPERATION_.BOREHOLE_NAME is name of the borehole
comment on column PSFO_TOTAL_OPERATION_.CONN_TIME is it is the duration of the connection for a given stand, from the moment
the stand is on slips until it is released from slips again
comment on column PSFO_TOTAL_OPERATION_.END_DEPTH is Bit depth at the end of the stand
comment on column PSFO_TOTAL_OPERATION_.ID is unique identifier of the stand
comment on column PSFO_TOTAL_OPERATION_.OPERATION_CODE is CODE from PSFO_OPERATION_
comment on column PSFO_TOTAL_OPERATION_.ROP_ON_BOTTOM is Rate of penetration on bottom. It is the distance drilled per
stand divided by the time when the bit is ON BOTTOM.
It excludes the time when bit off bottom and drillstring is in slips.
comment on column PSFO_TOTAL_OPERATION_.STAND_TIME is stand duration, it is the total time the stand was active and
includes the time for all activities
```

530

```
...
Here is a list of all possible values some categorical columns can take:
BOREHOLE_NAME:['LORIS 12H' 'LORIS 1H' 'LORIS 11H' 'LORIS 13H' 'LORIS 10H' 'LORIS-14H']
OPERATION_CODE:['Tripping' 'Casing' 'Drilling' 'Pick Up/Lay Down' 'Backreaming']
```

| | Connect surface lines | Pressure test | Low pressure test | High pressure test |
|---|---|---|---|---|
| Rig 1 | 16.4 | 21.3 | 34.6 | 35.6 |
| Rig 2 | 18.3 | 25.6 | 23.5 | 26.4 |
| Rig 3 | 8.3 | 13.5 | 35.7 | 37.8 |

FIG. 6

Distribution of Data Across Difficulty Levels and Sources

FIG. 7

DRILLING PERFORMANCE ASSISTED WITH AN ARTIFICIAL INTELLIGENCE ENGINE

CROSS-REFERENCE TO RELATED APPLICATIONS

This application claims priority to U.S. Provisional Patent Application No. 63/604,217, filed on Nov. 30, 2023, which is incorporated by reference.

BACKGROUND

Currently, drilling operators do not possess any tools that are able to efficiently consume, correlate, and analyze the massive amount of high and low frequency well data and the corresponding drilling parameters available in drilling performance databases. In other words, conventional methodology is time-consuming, expensive and involves a level of expertise on the data science domain that is in most cases beyond the skillsets of engineers in the oil field. Yet, data-driven drilling decisions should be made in real-time as a well is being drilled to prevent any unplanned events leading to non-productive time (NPT), to orchestrate proper remedial operations or during planning stages. In addition, in order to be able to efficiently query such databases, the drilling operator currently should be well versed in database queries, and the underlying data model of the drilling performance application.

SUMMARY

A method, a computing system, and a non-transitory computer-readable medium for extracting data from a database for use in a well construction process are disclosed. The method includes receiving a question from a user. The question is in a well construction language. The method also includes determining context based upon the question. Determining the context includes retrieving key performance indicators (KPIs) based upon the question, and retrieving a plurality of tables from the database. The tables are retrieved based upon the question. The method also includes generating a prompt based upon the question and the context. The method also includes generating a structured query language (SQL) query based upon the prompt using a large language model (LLM). The method also includes running the SQL query against the tables in the database in an attempt to produce a new table. The method also includes performing a wellsite action in response to the new table.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 4A and 4B illustrate a total operations table (e.g., in an SQL database), according to an embodiment.

FIG. 5 illustrates schema (e.g., from the table in FIGS. 4A and 4B), according to an embodiment.

FIG. 6 illustrates a new table showing BOP testing data, according to an embodiment.

FIG. 7 illustrates a graph showing a distribution of data across difficulty levels and sources, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
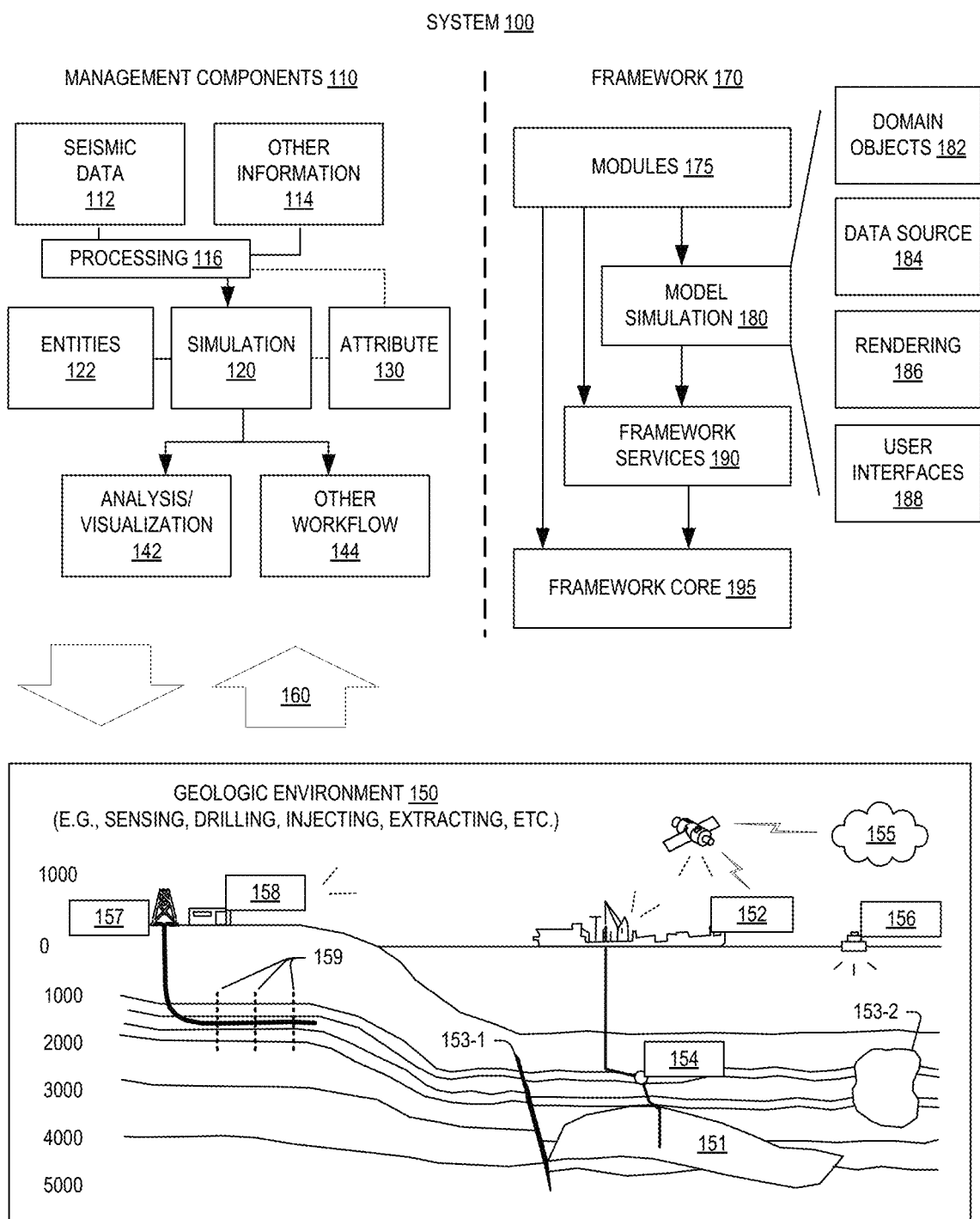
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more mesh-less techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Drilling Performance System Assisted with an Artificial Intelligence (AI) Engine The present disclosure includes a system and method that combine the underlying database of a drilling performance application with a large language model (LLM) to convert drilling language from a user into queries for a database. More particularly, the present disclosure includes a pre-trained generative artificial intelligence (GenAI) model in the oilfield domain that may be used to understand human language and translate the human language into SQL queries (e.g., What is my best performing Rig?) for the database. The database may then generate the answer for the user.

Currently, generating drilling insights that are not pre-built into a drilling performance analysis application (e.g., in existing dashboards) involves a software development team understanding and generalizing the request, and then building a new software frontend component to process the request. The present disclosure allows any drilling engineer to query a complex data model without any prior knowledge of the SQL or the data model itself. This may reduce the software development costs and provide a differentiator with conventional drilling performance applications.

The AI drilling assistant powered by generative AI technology aims at boosting a drilling teams' productivity and efficiency, to take real-time drilling decisions impacting rigs, and to conduct impactful post-mortem analyses to understand and suggest drilling practices to be put in place. The AI drilling assistant also enables a user to improve drilling operations in a competitive landscape.

How the AI Model Works

The process begins with a natural language parser, which breaks down the natural language query into its core components. This parsing stage identifies the entities, relationships, and operations specified in the query. Subsequently, a pretrained model utilizes this detailed representation to generate one or multiple semantically accurate SQL queries, designed for optimal execution within a database environment. The approach of utilizing a LLM to solely generate SQL queries on a known database schema is an efficient way to ensure that the model doesn't return unexpected results.

Figure 2:
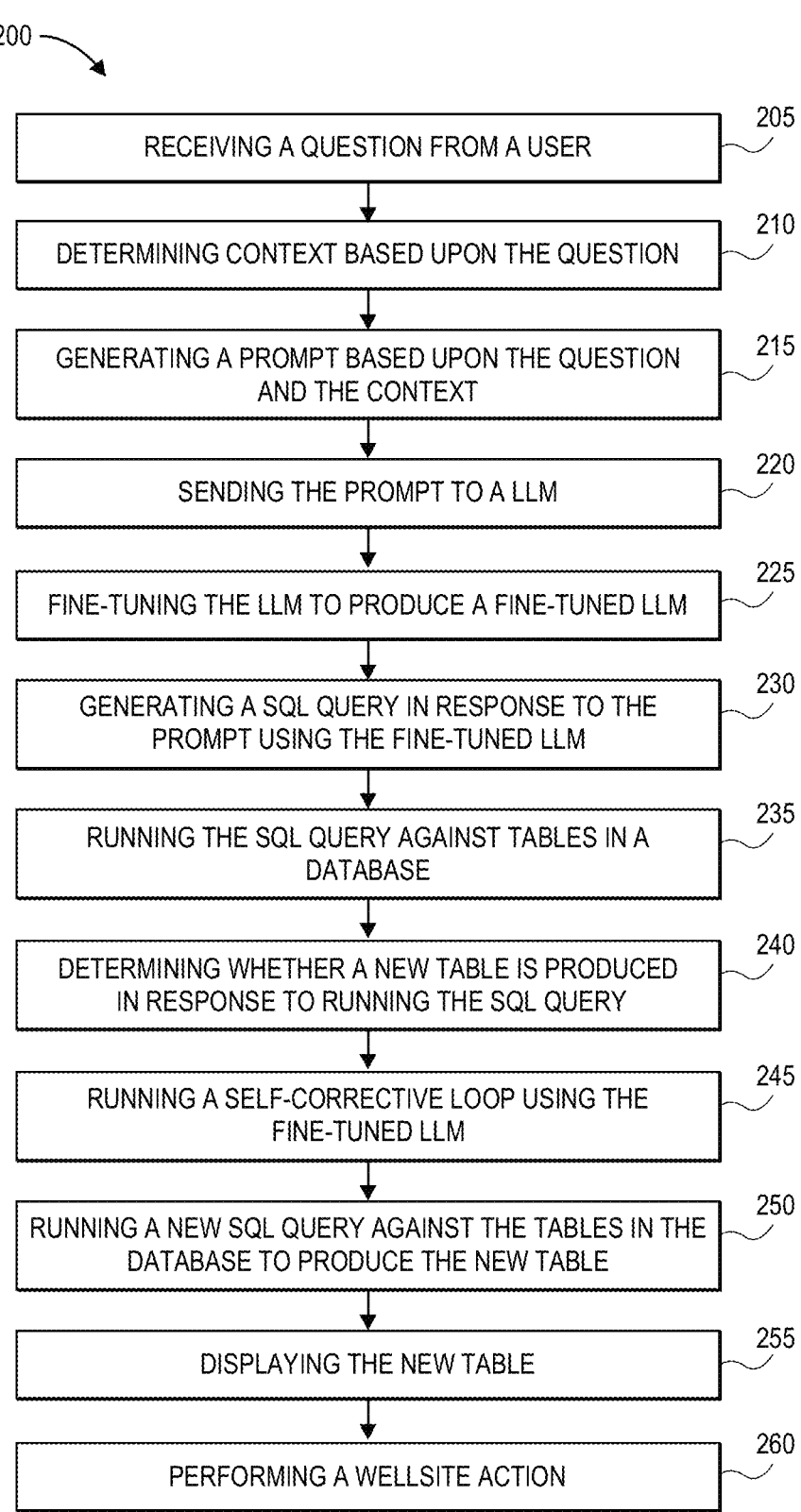
FIG. 2 illustrates a flowchart of a method for analyzing technology, asset, and operational performance during a drilling process, according to an embodiment.
Figure 3:
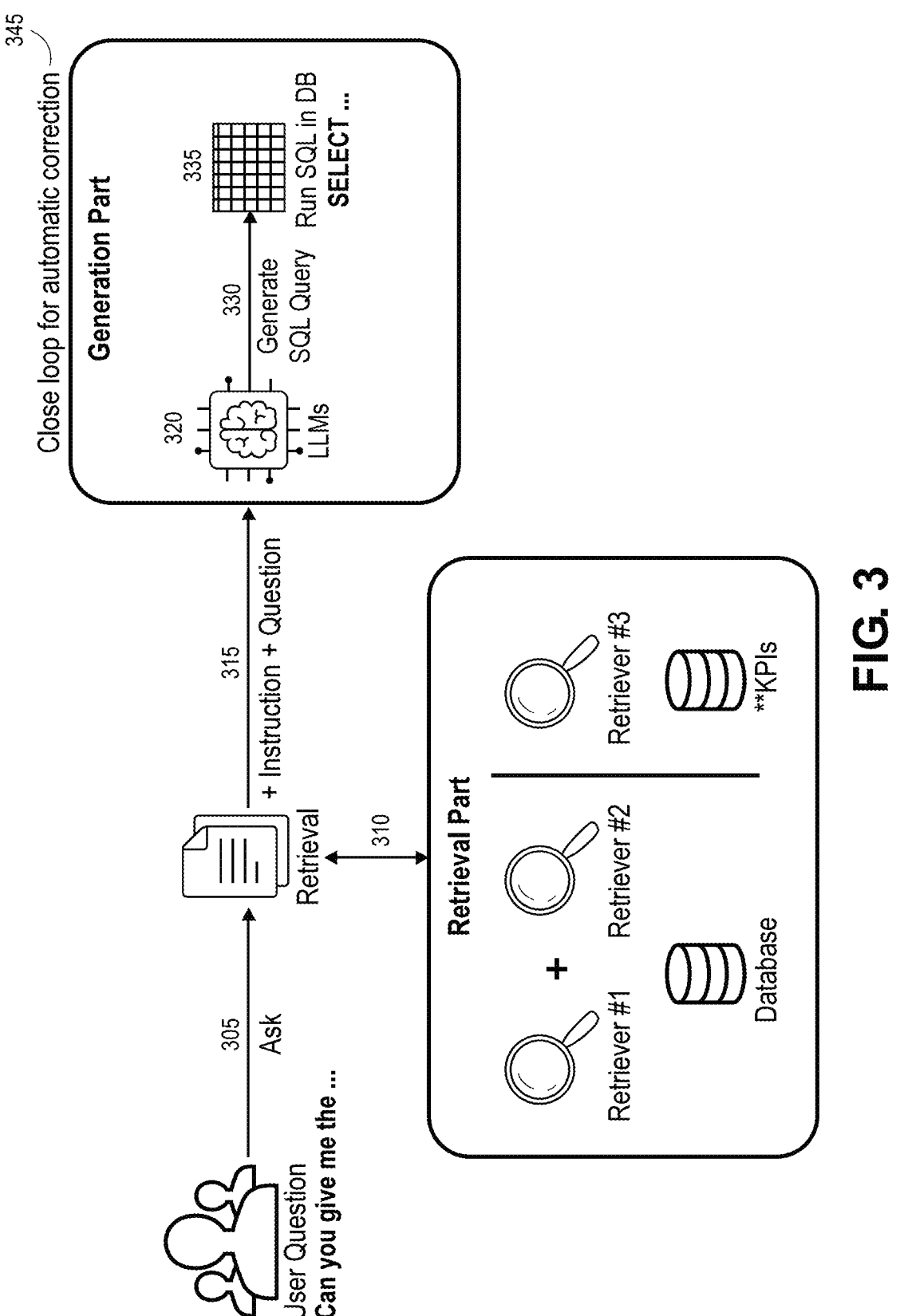
FIG. 3 illustrates a schematic of the method in FIG. 2, according to an embodiment.

FIG. 2 illustrates a flowchart of a method 200 for extracting data from a database for use in a well construction process, according to an embodiment. FIG. 3 illustrates a schematic view of the method 200. The method 200 may also or instead be used for analyzing technology, asset, and operational performance during a drilling process. An illustrative order of the method 200 is provided below; however, one or more portions of the method 200 may be performed in a different order, simultaneously, repeated, or omitted. At least a portion of the method 200 may be performed using the system shown the computing system shown in FIG. 8.

The method 200 may include receiving a question from a user, as at 205. This is also shown at 305 in FIG. 3. The question may be in a well construction language. For example, the question may be:

Can you give me the average on bottom ROP for each well of the project?

The method 200 may also include determining context based upon the question, as at 210. This is also shown at 310 in FIG. 3. Determining the context may include retrieving key performance indicators (KPIs) based upon the question and/or retrieving a plurality of tables from a database. Examples of KPIs (e.g., based upon the example question above) may include:

on bottom ROP, and/or on bottom ROP by formation

Retrieving the KPIs may include extracting key words from the question. An example of key words (e.g., in the example question above) may include "bottom ROP." Retrieving the KPIs may also include determining the KPIs based upon the key words.

Each of the KPIs may include one or more KPI definitions. Examples of KPI definitions (e.g., based upon the example KPI above) may include:

The definition of "on bottom ROP" is: "the distance drilled per stand divided by the time when the bit is on bottom. It excludes the time when bit off bottom and on-slips."

The definition of "on bottom ROP by formation" is: "(max depth-min depth [by formation])/duration [rs(0, 1)]."

The one or more KPI definitions may be determined based on a retrieval augmented generation (RAG) method with a semantic similarity search. The semantic similarity may be or include cosine similarity. Each of the KPIs may have a corresponding KPI vector. Retrieving the KPIs may also include retrieving the KPIs and/or the KPI definitions based upon the KPI vectors.

The tables may be retrieved based upon the question. Retrieving the tables may include identifying schema from the tables. FIGS. 4A and 4B illustrate a table (e.g., a total operations table in an SQL database), and FIG. 5 illustrates schema (e.g., from the table in FIGS. 4A and 4B), according to an embodiment. The schema may be or include names, types, and descriptions of the tables 510; names, types, and descriptions of columns in the tables 520; types of data in the columns 530; foreign keys of the tables 540 to explain how the tables are related to each other; and non-numerical categorical values in the tables 550 (e.g., to avoid hallucinations). In one embodiment, content (e.g., measured and/or simulated data) in the tables may not be retrieved. Each schema may have a corresponding schema vector. Retrieving the tables may also include retrieving the tables and/or the schema based upon the schema vectors. The schema may be retrieved using an ensemble method that includes a parent-document retriever and/or cosine similarity.

The method 200 may also include generating a prompt based upon the question and the context, as at 215. This is also shown at 315 in FIG. 3. Examples of the prompt (e.g., based upon the example question and example context above) may include:

Question 1: "Can you give me the average ROP per stand for the build-up section group by well?"

Helpful Answer 1: "SELECT borehole_name, SUM (rop_per_stand*stand_time)/SUM (stand_time) AS rop_per_stand FROM psfo_total_operation_WHERE operation_code='Drilling' AND curvature_type='curve' AND rop_per_stand IS NOT NULL GROUP BY borehole_id, borehole_name ORDER BY rop_per_stand DESC".

Question 2: Give me the well that had the highest on bottom ROP in the 8.5 section.

Helpful Answer 2: select*from (SELECT borehole_name, borehole_id, AVG(rop_on_bottom) avg_rop_on_bottom FROM psfo_total_operation_WHERE operation_code='Drilling' AND section_size=8.5, GROUP BY borehole_id, borehole_name) t where rownum=1 order by avg_rop_on_bottom desc".

The prompt may be or include an instruction sentence, the question, the context, training examples of training questions and training structured query language (SQL), or a combination thereof. An example of the instruction sentence may include:

"You are a text to SQL expert and your job is to write a syntactically correct Oracle SQL query given a user's question. Please return a json object with keys 'sql_query' and 'justification' only."

Generating the prompt may also or instead include dynamically selecting one or more of the training examples. The one or more training examples may be selected using dynamic few shot prompting. The one or more training examples may be semantically closest to the question.

The method 200 may also include sending the prompt to a large language model (LLM), as at 220. This is also shown at 320 in FIG. 3.

The method 200 may also include fine-tuning the LLM to produce a fine-tuned LLM, as at 225. The LLM may be fine-tuned using historical well construction examples. The historical examples may be or include historical questions and/or historical SQL.

The method 200 may also include generating a SQL query based upon or in response to the prompt, as at 230. This is also shown at 330 in FIG. 3. The SQL query may be generated using the (e.g., fine-tuned) LLM. The SQL query may be or include a code. An example of the SQL query (e.g., in response to the example prompt above) may include:

"SELECT borehole_name, AVG (rop_on_bottom) AS avg_on_bottom_rop FROM PSFO_TOTAL_OPERA-TION_WHERE operation_code='Drilling' GROUP BY borehole_name."

The method 200 may also include running the SQL query against the tables (e.g., in the database), as at 235. This is also shown at 335 in FIG. 3. As used herein, running the SQL query against the tables may include executing the SQL query on the tables on the server to retrieve the data table that is outputted to the user as a final answer to the question. The SQL query may be run in an attempt to produce a new table.

The method 200 may also include determining whether a new table is produced in response to running the SQL query, as at 240. The new table may include the KPIs (from 205) and/or new KPIs.

If the new table is produced, the method 200 may jump to 255. If the new table is not produced (e.g., because running the SQL query failed), the method 200 may also include running a self-corrective loop using the fine-tuned LLM, as at 245. This is also shown at 345 in FIG. 3. The self-corrective loop may use a new prompt to generate a new SQL query. An example of a wrong/failed SQL query may include:

"SELECT borehole_name, AVG(bottom_on_rop) AS avg_on_bottom_rop FROM PSFO_TOTAL_OPERA-TION_GROUP BY borehole_name." There is an execution error when executing/running this query because the LLM hallucinates on the column name "bottom_on_rop" that doesn't exist.

The new prompt may be based upon the SQL query that failed, an instruction to correct the SQL query, the question, the context, error logs that are produced by the fine-tuned LLM when the SQL query fails, and a set of constraints. The instruction may include:

"When executing SQL below, some errors occurred. Please fix up the Oracle query based on question and database info. Solve the task step by step if you need to. When you find an answer, verify the answer carefully so that the error will not happen again. Include verifiable justification in your response if possible."

An example of an error that is retrieved and fed to the prompt may include:

- "SQL error: ORA-00904: "BOTTOM_ON_ROP": invalid identifier Exception class: DatabaseError."

Example constraints may include:

- In 'SELECT <column>', just select needed columns in the Question without any unnecessary column or value
- In 'FROM <table>' or 'JOIN <table>', do not include unnecessary table
- If [Value examples] of <column> has 'None' or None, use 'JOIN <table>' or 'WHERE <column> is NOT NULL' is better
- If the question does not seem related to the database, just return "I don't know" as the answer.
- Make sure to return a JSON blob with keys 'sql_query' and 'justification'

The method 200 may also include running the new SQL query against the tables in the database to produce the new table, as at 250.

The method 200 may also include displaying the new table, as at 255. FIG. 6 illustrates a new table showing blowout preventer (BOP) testing data, according to an embodiment. Based upon the example shown in FIG. 6, a drilling engineer may determine that Rig 3 should be selected to connect and pressure test, while Rig 2 may be more efficient for performing high and low pressure testing.

The new table may be the result of the new SQL query. For example, the new query may include:

- SELECT borehole_name, AVG(bottom_on_rop) AS avg_on_bottom_rop FROM PSFO_TOTAL_OPERATION_ GROUP BY borehole_name New generated query => SELECT BOREHOLE_NAME, AVG(ROP_ON_BOTTOM) AS AVG_ON_BOTTOM_ROP FROM PSFO_TOTAL_OPERATION_ GROUP BY BOREHOLE_NAME The method 200 may also include performing a wellsite action, as at 260. The wellsite action may be performed in response to the new table. More particularly, the new table may include insights on controllable parameters (e.g., pressure, testing the fluid rate, etc.) that may be adjusted to make sure that wellsite component or process (e.g., blowout preventer, bottoms-up circulation) is functioning properly and safely. The wellsite action may be or include generating and/or transmitting a signal (e.g., using a computing system) that instructs or causes a physical action to occur at a wellsite. The wellsite action may also or instead include performing the physical action at the wellsite. In one embodiment, the physical action may be or include testing a BOP in the well, reducing bottoms-up circulation times in the well, or both. In another embodiment, the physical action may include selecting where to drill the well or a new well, drilling the well, varying a weight and/or torque on a drill bit that is drilling the well, varying a drilling trajectory of the well, varying a concentration and/or flow rate of a fluid pumped into the well, or the like.

Example 1

The question or SQL query may be "can you generate a pivot of BOP testing times by stage by rig?" The output in the new table (e.g., Figure 6) may be:
- In rows: rigs
- In columns: connect surface lines, pressure test, low pressure test, high pressure test, bleed off
- And the values in the cells The output in the new table may be used by a drilling engineer to identify the (e.g., optimal) sequence for testing or operating the BOP as a combination of stages and to develop new procedures. The drilling engineer may then test or operate the BOP based upon the output, the stages, and/or the new procedures.

Example 2

The question or SQL query may be "for the 12.25" section, can you segment the bottoms-up circulation times for the wells between 1-1.5, 1.5-2, >2 bottoms up (columns) by target formation (rows) and find the number of hole cleaning issues for each combination?" The output in the new table may provide the drilling engineer with an estimation of how important it is to circulate more or less frequently depending upon historical well issues. The drilling engineer can then circulate more or less frequently based upon this output.

Internship Report

Figure 7:
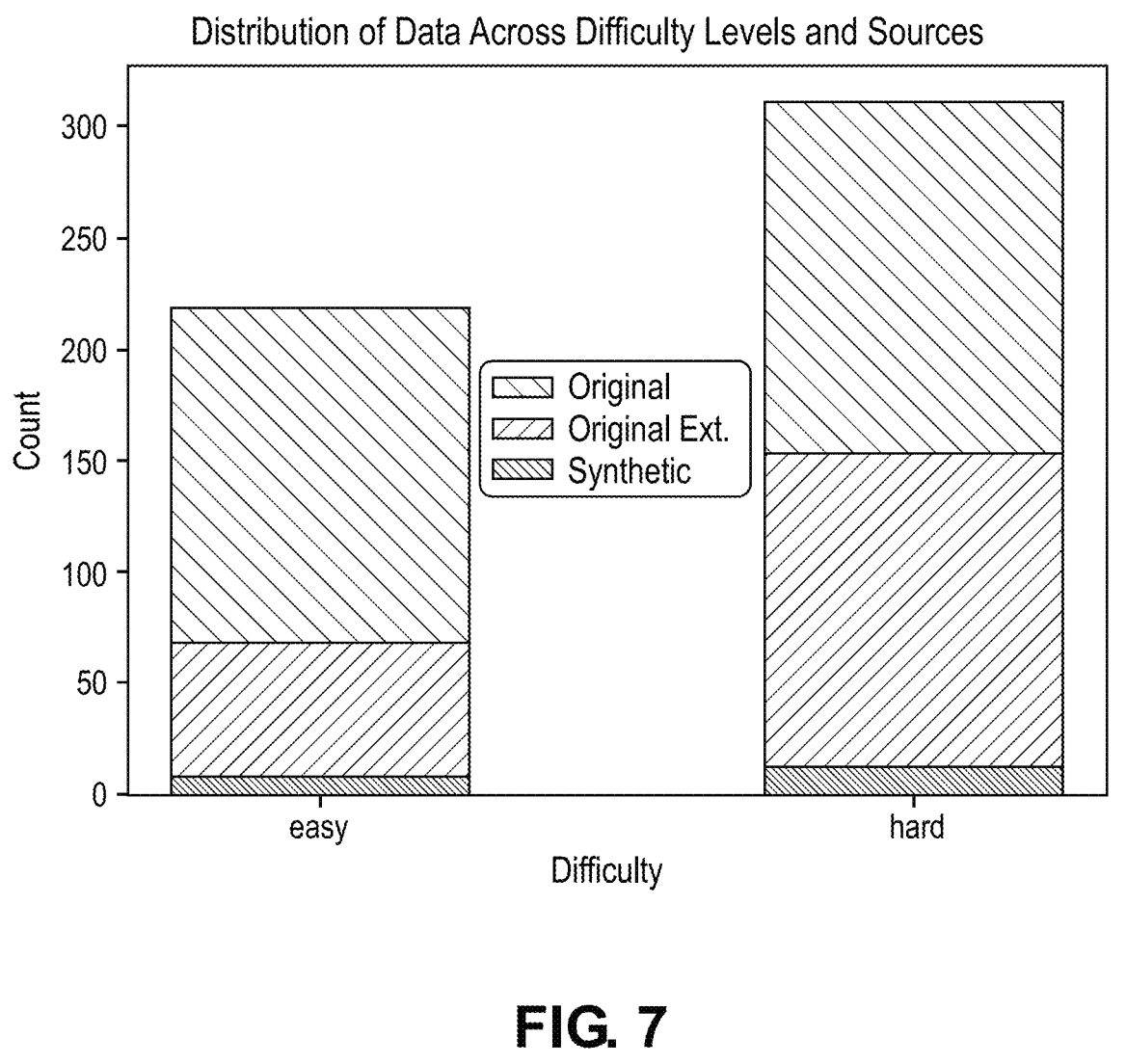

FIG. 7 illustrates a graph showing a distribution of data across difficulty levels and sources, according to an embodiment. Data augmentation may be performed using prompt engineering techniques (e.g., using the same model version as previously). This augmentation increased the dataset to 531 pairs, representing an improvement over the original quantity. FIG. 7 illustrates the four categories of the dataset:

Original set: The original set of 24 pairs.

Extended set: This category involved paraphrasing both the prompts and the SQL queries to enrich the semantic relationships within the data.

Synthetic set: Completely generated from the SQL table schema to create new pairs.

Fine-Tuned Embedding Model

The training set may be transformed into text pairs of prompts (e.g., anchor $a_i$) and context (e.g., positive sample $p_i$) to capture relationships and/or similarities between sentences, which directly impacts the choice of loss function. One objective in fine-tuning is to ensure that positive samples are positioned closer to the anchor in the embedding space.

Generation Part

Due to the strict nature of the EX evaluation, may not fully capture the model's capabilities in this specific case, the assessment may be refined by adopting a subset evaluation method, and extending it to account for the values retrieved, particularly in cases where differences in the WHERE condition may affect the result sets. This refinement allows for a comparison of the structure and the specific values retrieved, addressing a gap in the standard Defog evaluation. This enhanced evaluation method may be termed "Value Execution Evaluation" (VEX). The VEX metric is calculated as follows:

$$VEX = \frac{1}{N}\sum_{i=1}^{N}\delta(C_i \subseteq \hat{C}_i) \cdot \gamma \cdot \frac{\sum_{j=1}^{|C_i \cap \hat{C}_i|}\delta\left(\text{row}_{ij}^{C_i} = \text{row}_{ij}^{\hat{C}_i}\right)}{|C_i \cap \hat{C}_i|}$$

where $C_i$ and $\hat{C}_i$ represent the sets of columns in the ground-truth and generated result sets, respectively. The first indicator function, $\delta(C_i \subseteq \hat{C}_i)$, checks if the generated columns are a subset of the ground-truth columns. The second part, controlled by a hyperparameter $\gamma$, calculates the ratio of matching values between the generated and ground-truth result sets within these columns, allowing flexibility in accommodating differences due to varying WHERE clauses. This provides a more nuanced assessment than previous evaluations, particularly for this example use case. It enables a better understanding of both structural and value-level correctness in the generated SQL queries.

The VEX equation corresponds to one or more metrics that may be used to evaluate a performance of the output/solution of the method 200. More particularly, one or more tailored metrics may be used to assess the drilling text-to-SQL pipeline. This, in turn, may be used to assess the current solution performance and monitor it over time. In one embodiment, the VEX equation may be evaluated separately from the above portions of the method 200 (e.g., before determining the context). For example, whenever new KPI definitions are added or the schema table context is enriched, the VEX equation may be used to ensure that the overall performance (e.g., of the method 200) is maintained or increases.

Figure 8:
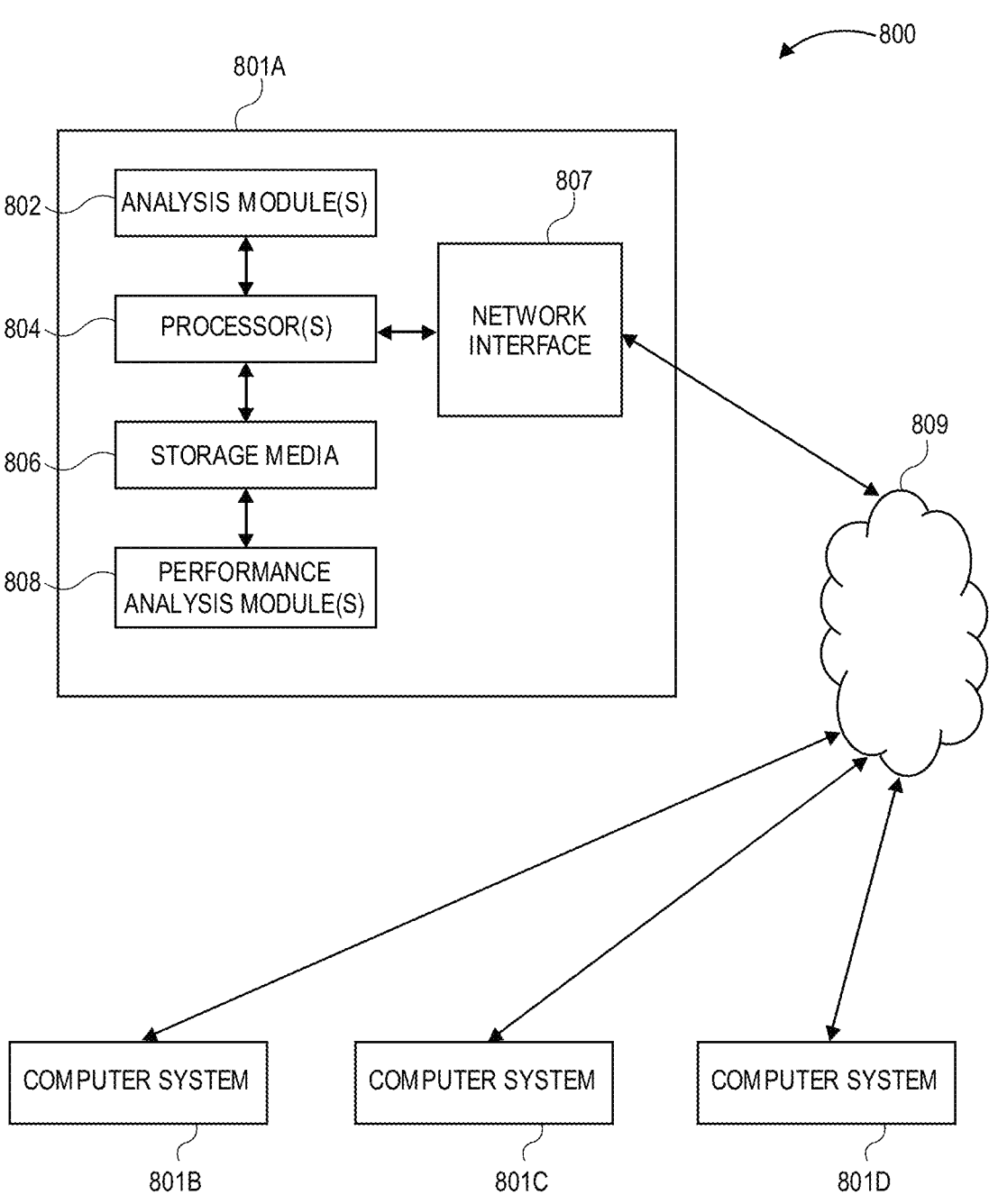
FIG. 8 illustrates a schematic view of a computing system for performing at least a portion of the method(s) herein, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 800 contains one or more drilling performance module(s) 808. It should be appreciated that computing system 800 is merely one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for extracting data from a database for use in a well construction process, the method comprising:
   receiving a question from a user, wherein the question is in a well construction language;
   determining context based upon the question, wherein determining the context comprises:
      retrieving key performance indicators (KPIs) based upon the question; and retrieving tables from the database, wherein the tables are retrieved based upon the question;
generating a prompt based upon the question and the context;
generating a structured query language (SQL) query based upon the prompt using a large language model (LLM);
running the SQL query against the tables in the database in an attempt to produce a new table;
running a self-corrective loop using the LLM in response to determining that the new table is not produced, wherein the self-corrective loop uses a new prompt to generate a new SQL query, wherein the new prompt is based upon the SQL query that failed, an instruction to correct the SQL query, the question, the context, error logs that are produced by the LLM when the SQL query fails, and a set of constraints; and
performing a wellsite action at a well in response to the new table.

2. The method of claim 1, wherein retrieving the KPIs comprises:
   extracting key words from the question;
   determining the KPIs based upon the key words, wherein each of the KPIs comprises KPI definitions, wherein the KPI definitions are determined based on a retrieval augmented generation (RAG) method with a semantic similarity search, wherein the semantic similarity search comprises cosine similarity, and wherein each of the KPIs has a corresponding KPI vector of KPI vectors; and
   retrieving the KPIs and the KPI definitions based upon the KPI vectors.

3. The method of claim 1, wherein retrieving the tables comprises:
   identifying schema from the tables, wherein the schema comprises names and descriptions of the tables, names and descriptions of columns in the tables, types of data in the columns, foreign keys of the tables to explain how the tables are related to each other, and non-numerical categorical values in the tables to avoid hallucinations, wherein content of the tables is not retrieved, and wherein each schema has a corresponding schema vector; and
   retrieving the tables and the schema based upon the schema vectors, wherein the schema is retrieved using an ensemble method that comprises a parent-document retriever and cosine similarity.

4. The method of claim 1, wherein the prompt comprises an instruction sentence, the question, the context, and training examples of training questions and training structured query language (SQL), wherein generating the prompt further comprises dynamically selecting one or more of the training examples, wherein the one or more of the training examples are selected using dynamic few shot prompting, and wherein the one or more of the training examples are semantically closest to the question.

5. The method of claim 1, further comprising:
   sending the prompt to the LLM; and
   fine-tuning the LLM using historical well construction examples to produce a fine-tuned LLM, wherein the historical well construction examples comprise historical questions and historical SQL, and wherein the SQL query is generated using the fine-tuned LLM.

6. The method of claim 1, further comprising determining the new table is produced in response to running the SQL query, wherein the new table comprises the KPIs or new KPIs.

7. The method of claim 1, further comprising running the new SQL query against the tables in the database to produce the new table.

8. The method of claim 1, further comprising displaying the new table.

9. The method of claim 1, wherein the wellsite action comprises testing a blowout preventer (BOP) in the well, reducing bottoms-up circulation times in the well, or both.

10. A computing system, comprising:

one or more processors; and a memory system comprising one or more non-transitory computer-readable media storing instructions that, when executed by at least one of the one or more processors, cause the computing system to perform operations, the operations comprising:

receiving a question from a user, wherein the question is in a well construction language;

determining context based upon the question, wherein determining the context comprises:

retrieving key performance indicators (KPIs) based upon the question; and retrieving tables from a database, wherein the tables are retrieved based upon the question;

generating a prompt based upon the question and the context;

generating a structured query language (SQL) query based upon the prompt using a large language model (LLM);

running the SQL query against the tables in the database in an attempt to produce a new table;

running a self-corrective loop using the LLM in response to determining that the new table is not produced wherein the self-corrective loop uses a new prompt to generate a new SQL query, wherein the new prompt is based upon the SQL query that failed, an instruction to correct the SQL query, the question, the context, error logs that are produced by the LLM when the SQL query fails, and a set of constraints; and performing a wellsite action in response to the new table.

11. The computing system of claim 10, wherein the operations further comprise determining the new table is produced in response to running the SQL query, and wherein the new table comprises the KPIs or new KPIs.

12. The computing system of claim 10, wherein the operations further comprise running the new SQL query against the tables in the database to produce the new table.

13. A non-transitory computer-readable medium storing instructions that, when executed by one or more processors of a computing system, cause the computing system to perform operations, the operations comprising:

receiving a question from a user, wherein the question is in a well construction language;

determining context based upon the question, wherein determining the context comprises:

retrieving key performance indicators (KPIs) based upon the question; and retrieving tables from a database, wherein the tables are retrieved based upon the question;

generating a prompt based upon the question and the context;

generating a structured query language (SQL) query based upon the prompt using a large language model (LLM);

running the SQL query against the tables in the database in an attempt to produce a new table;

determining the new table is produced in response to running the SQL query, wherein the new table comprises the KPIs or new KPIs;

running a self-corrective loop using the LLM in response to the SQL query failing such that the new table is not produced, wherein the self-corrective loop uses a new prompt to generate a new SQL query, wherein the new prompt is based upon the SQL query that failed, an instruction to correct the SQL query, the question, the context, error logs that are produced by the LLM when the SQL query fails, and a set of constraints; and performing a wellsite action at a well in response to the new table.

14. The non-transitory computer-readable medium of claim 13, wherein retrieving the KPIs comprises:

extracting key words from the question;

determining the KPIs based upon the key words, wherein each of the KPIs comprises KPI definitions, wherein the KPI definitions are determined based on a retrieval augmented generation (RAG) method with a semantic similarity search, wherein the semantic similarity search comprises a first cosine similarity, and wherein each of the KPIs has a corresponding KPI vector of KPI vectors; and retrieving the KPIs and the KPI definitions based upon the KPI vectors;

wherein retrieving the tables comprises:

identifying schema from the tables, wherein the schema comprises names and descriptions of the tables, names and descriptions of columns in the tables, types of data in the columns, foreign keys of the tables to explain how the tables are related to each other, and non-numerical categorical values in the tables to avoid hallucinations, wherein content of the tables is not retrieved, and wherein each schema has a corresponding schema vector of schema vectors; and retrieving the tables and the schema based upon the schema vectors, wherein the schema is retrieved using an ensemble method that comprises a parent-document retriever and a second cosine similarity.

15. The non-transitory computer-readable medium of claim 14, wherein the prompt comprises an instruction sentence, the question, the context, and training examples of training questions and training structured query language (SQL), wherein generating the prompt further comprises dynamically selecting one or more training examples of the training examples, wherein the one or more training examples are selected using dynamic few shot prompting, and wherein the one or more training examples are semantically closest to the question.

16. The non-transitory computer-readable medium of claim 13, wherein performing the wellsite action comprises generating or transmitting a signal that instructs or causes a physical action to occur, and wherein the physical action comprises testing a blowout preventer (BOP) in the well, reducing bottoms-up circulation times in the well, or both.

\* \* \* \* \*